United States Patent [19]

Whitaker

[11] Patent Number: 5,046,282
[45] Date of Patent: Sep. 10, 1991

[54] AUTOMATIC WICK WATERER FOR PLANTS

[76] Inventor: Dale Whitaker, Hacienda Height, Calif.

[21] Appl. No.: 534,694

[22] Filed: Jun. 6, 1990

Related U.S. Application Data

[63] Continuation-in-part of Ser. No. 341,481, Apr. 21, 1989.

[51] Int. Cl.⁵ ............................................. A01G 27/00
[52] U.S. Cl. ............................................. 47/79; 47/81
[58] Field of Search ................. 137/78.2, 78.3, 199; 73/73; 239/63, 64; 47/79, 81, 80, 66

[56] References Cited

U.S. PATENT DOCUMENTS

| | | | |
|---|---|---|---|
| 2,743,552 | 5/1956 | Hunter | 47/79 X |
| 3,758,987 | 9/1973 | Crane | 47/80 |
| 3,910,320 | 10/1975 | Tal | 47/79 X |
| 4,040,436 | 8/1977 | Caldwell | 47/79 X |
| 4,055,200 | 10/1977 | Lohoff | 239/63 X |
| 4,231,187 | 11/1980 | Greenbaum | 47/80 |
| 4,329,815 | 5/1982 | Secrest | 47/80 |
| 4,383,543 | 5/1983 | Rawlins | 47/80 X |
| 4,922,945 | 5/1990 | Browne | 137/78.3 |
| 4,938,248 | 7/1990 | Browne | 137/78.3 |

FOREIGN PATENT DOCUMENTS 8302213 12/1982 PCT Int'l Appl. ................. 137/78.3

Primary Examiner—David A. Scherbel
Assistant Examiner—Michele A. Van Patten
Attorney, Agent, or Firm—William H. Maxwell

[57] ABSTRACT

An automatic soil waterer, especially for potted plants, having an airtight water supply chamber with a discharge into the soil controlled by a hydrophilic probe element followed by a hydrophobic element, preferably with an entrapment chamber therebetween, passing soil air into the water supply chamber, thereby discharging a proportional amount of water into the soil, there being water discharge control by means of a well open to the water supply chamber discharge and with a capillary wick therein exposed to the rise of water in the well and extending into the soil to wet the same.

23 Claims, 2 Drawing Sheets

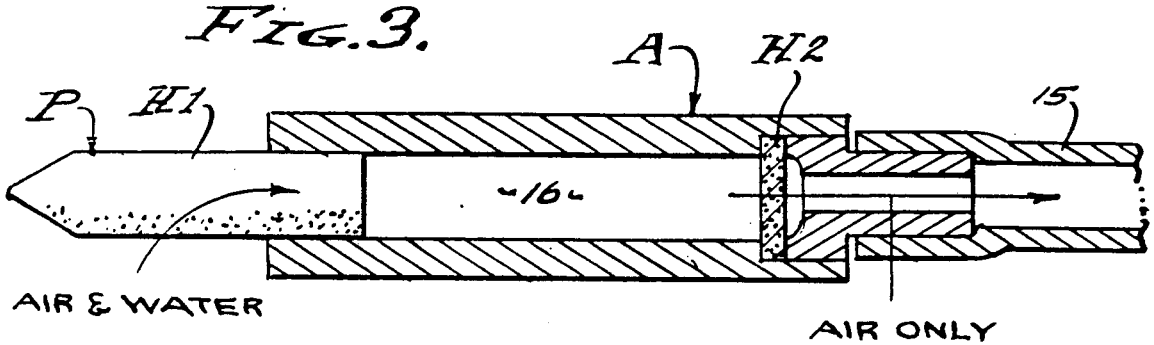
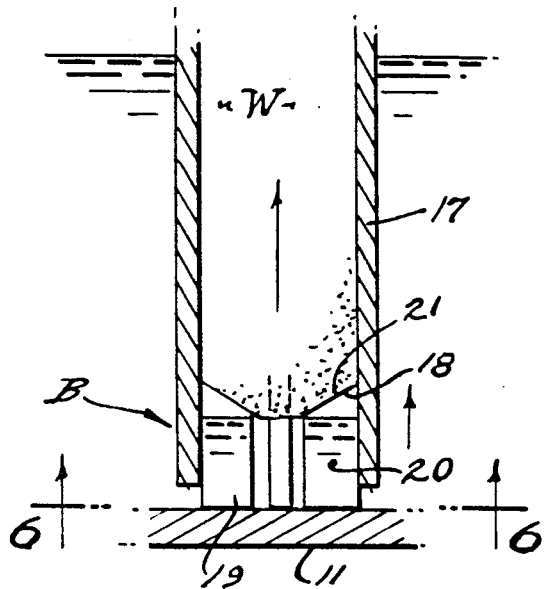
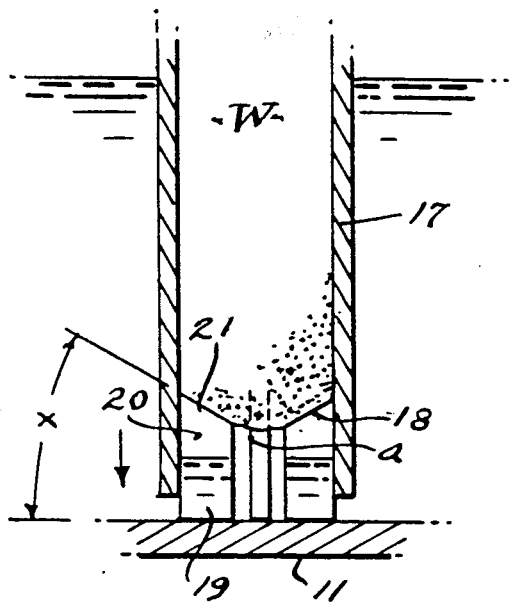
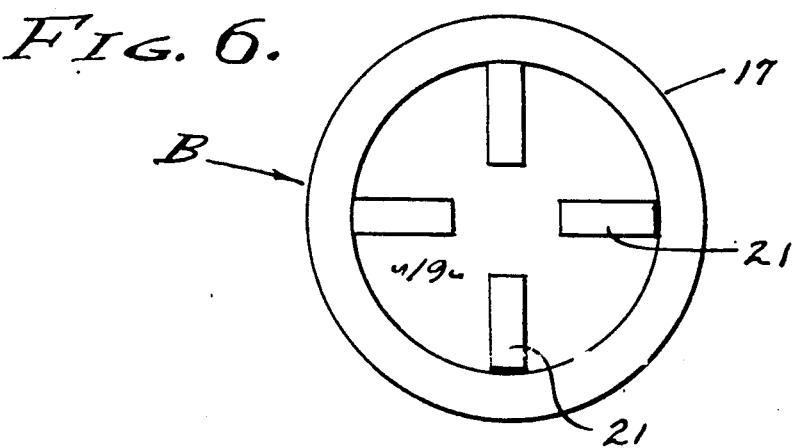

AUTOMATIC WICK WATERER FOR PLANTS

This is a continuation in part of application Ser. No. 07/341,481 filed Apr. 21, 1989, entitled PLANT WATERING DEVICE.

BACKGROUND OF THE INVENTION

This invention relates to automatic watering apparatus for growing plants, particularly potted plants, by means responsive to dampness of the soil or growing medium watered thereby. Dampness of the soil or growing medium is sensed in comparison with 'field capacity,' which is a condition in which the soil is saturated to the point where it can hold no more water against the pull of gravity. The dampness requirement varies with different plants, and in most all situations is a condition substantially less than field capacity, it being a general object of this invention to control soil dampness as may be required.

'Field Capacity' refers to a condition in which each soil particle holds the maximum amount of water film against the pull of gravity, the amount of air space in the soil being low. As plant roots and evaporation withdraw water from the soil, the film of water becomes thinner and more space is gained for soil air. When the film becomes so thin that its molecular attraction to the soil particles is stronger than the root tips ability to extract it, the plant will wilt even though some water remains in the soil. During the stages in which soil dries from field capacity to the wilting point, the plant has sufficient water for healthy growth. Field capacity varies by soil type; clay soil with many fine particles holds more water than sandy soil with fewer, courser particles, and loamy soils which contain a mixture of particle sizes have an intermediate field capacity.

Heretofore, automatic and self watering devices for potted plants have involved wicks, water transfer tubes, and air displacement tubes controlled by porous elements, and characterized by complexity and subject to malfunction due to clogging of the water tube and/or air tube. And, with the use of wicks alone it is difficult to control soil moisture levels.

The Crane Jr. U.S. Pat. No. 3,758,987 issued Sept. 18, 1973 is an example of the prior art, wherein a moisture sensor buried in the soil controls the entry of displacement air into a substantially airtight tank permitted to discharge water into the soil through a filter. Though the Crane Jr. principle is workable, it is subject to malfunction due to the passage of some water through the porous element, so that the air tube becomes clogged with the accumulation of water which cannot be readily displaced by the available pressure differential. That is, the porous element of Crane Jr. allows water to collect in the air transfer tube supplying air to the closed water reservoir. Another problem with the Crane Jr. principle is that a meniscus will form near the discharge filter and thereby obstruct the flow of water into the soil or growing medium. It is therefore an object of this invention to eliminate the entry of water into the air transfer tube, by the provision of a protective air suction control means, and to preclude said meniscus, and to these ends I provide a hydrophobic element following the aforesaid hydrophilic element, and preferably with a liquid entrapment chamber therebetween.

The Endling U.S. Pat. No. 4,344,251 issued Aug. 17, 1982 is an example of the prior art, wherein a water transfer wick is buried in the soil for the gradual delivery of water therethrough, but lacking a method of restraining the flow of water between the reservoir and soil or growing medium. Consequently, water delivery into the soil will continue until field capacity is reached, which is deleterious to most all plants. Therefore, it is an object of this invention to combine wick water transfer with the aforesaid air suction control means, and to this end I provide a wick water control means responsive to the controlled delivery of supply water to effectively immerse and wet and saturate the wick for water transfer as circumstances require. Accordingly, the wick does not continuously transfer water, but is responsive to the soil dampness as sensed by the air suction control means.

Experiments with various types of wicking products indicated natural fibrous materials deteriorated within a few months. Materials displaying the greatest longevity were made of polyester or bonded acetate. It was also noted that the density of the wicking material determined the rapidity at which fluid was transferred. For example, the bonded material originally used as ink reservoir material as produced by American Filtrona in Richmond, Va. can easily transfer a liter of water, not containing particulate material, per hour.

During tests in which porous hydrophilic materials were evaluated, it was discovered that the pores in this material became encumbered quickly when a several cubic centimeters of soil water flowed through the porous rod into the air tube as would occur in the daily use of the Crain Jr. patent. Dramatically restricting the flow-through characteristic of the air valve by placing a hydrophobic membrane behind the hydrophilic rod significantly increased the length of time the air valve continued to function.

The air suction control means and the wick water control means can be embodied in a variety of ways, directly into the garden soil or into the growing medium of a planter box or pot. As shown and described herein, a potted plant is under consideration, with the automatic wick waterer means conveniently arranged for discharging water into the bottom of a pot and subject to control by the dampness of the growing medium surrounding the plant root system within the pot. In accordance with this invention, the waterer is a unit which is applicable to installation within a planter pot containing soil or growing medium, or it is applicable as a platform upon which a potted plant is supported. Accordingly, it is an object of this invention to provide a water supply unit suitable for either inside or outside use, with respect to a planter pot, and a unit which incorporates both the air suction control means and the wick water control means. In practice, the water supply container is a flat closed vessel of round form to be set into or beneath a pot of complementary round form. Being flat, the vessel is shallow so that the head of water pressure is commensurately slight, however, it is existent and subject to delicate control by the aforesaid air suction control means. This slight pressure and delicate control has its advantageous results in the function of the wick water control means, all as hereinafter described, there being a delivery water level movement that raises and lowers the water for immersion or retraction of the lower end of the wick exposed thereto.

SUMMARY OF THE INVENTION

The preferred embodiment of this Automatic Wick Waterer For Plants is for use with planter pots to be buried therein or as a support therefor. Accordingly, the water supply vessel is a flat closed and sealed chamber having a filler opening sealed by a removable plug, having an air transfer opening closed by an air transfer tube, and having a water well for water transfer into the wick. The filler opening gives access to replenish the water supply which is sealed when the filler plug is reinserted, and essentially hermetic except for the discrete differential pressure control that supplies the wick water as and when required. The air suction control means is a flexible air suction tube that opens into the top of the water supply vessel to permit recession of the water level therein. A feature of said suction control means is its hydrophilic element exposed to the soil, as a probe, and followed by a hydrophobic element with a liquid entrapment chamber therebetween. Soil or growing medium in a condition other than at field capacity is aerated to some degree and responsive to said suction control means which passes air into the entrapment chamber. It is recognized that some water also passes through the hydrophilic element so as to enter the entrapment chamber, where it is captured by the hydrophobic element through which the air passes. A reverse process can and does occur, wherein the flow is out of the chamber through the hydrophilic element and back into the soil.

The wick well extends through the top of the water supply vessel and to the bottom thereof where it is open to receive the discharge of water into the well, as and when permitted to flow by entry of air into the water supply vessel. A feature is the upward spacing of the terminal bottom end of the wick from the lower open end of the well into the water supply. The spacing is of a discrete determined height, whereby a water level in the well alternately rises to immerse the terminal bottom end of the wick, and recedes so as to withdraw and expose the wick. The wick remains stationary and responds to the changing water level in the chamber 20. Upon immersion into the rising water the wick withdraws water for transfer upwardly into the soil by capillary action, and conversely upon the recession of water in the well, the wick is no longer in contact with water and ceases to transfer water.

Operation of this waterer is initiated by filling the water supply vessel with water and closing the same with the filler plug. The wick is buried in the soil or growing medium at or in the bottom area of the planter pot, and the probe end of the suction control means is buried at a selected distance from the stem of the plant. The water level in the water supply is above the inlet located at the that water is discharged by gravity into the well resulting in a receding water level in and that reduces air pressure in the closed water supply chamber. However, the water supply chamber is in open communication with the air transfer tube to receive displacement air monitored by the probe. The hydrophobic element protects the open connection into the air transfer tube, so that moisture is effectively precluded from entering therein. Consequently, as dampness is increased in the soil or growing medium, water is drawn into the entrapment chamber which commensurately restricts the flow of air into the air transfer tube. And, when the entrapment chamber is filled with water the flow of air is reduced, causing the water level to recede from the bottom terminal end of the wick resulting in water shut-off therethrough.

The foregoing and various other objects and features of this invention will be apparent and fully understood from the following detailed description of the typical preferred forms and applications thereof, throughout which description reference is made to the accompanying drawings.

THE DRAWINGS

FIG. 3 is an enlarged detailed sectional view of the moisture responsive probe that characterizes this invention.

FIGS. 4 and 5 are enlarged detailed sectional views of the wick and wick well that also characterizes this invention, FIG. 4 showing the rising water contacting the wick for its immersion, and FIG. 5 showing a receding water level retracting from the wick for its exposure.

And, FIG. 6 is an enlarged detailed lower end view of the well taken as indicated by line 6—6 on FIG. 4.

PREFERRED EMBODIMENT

Figure 1:
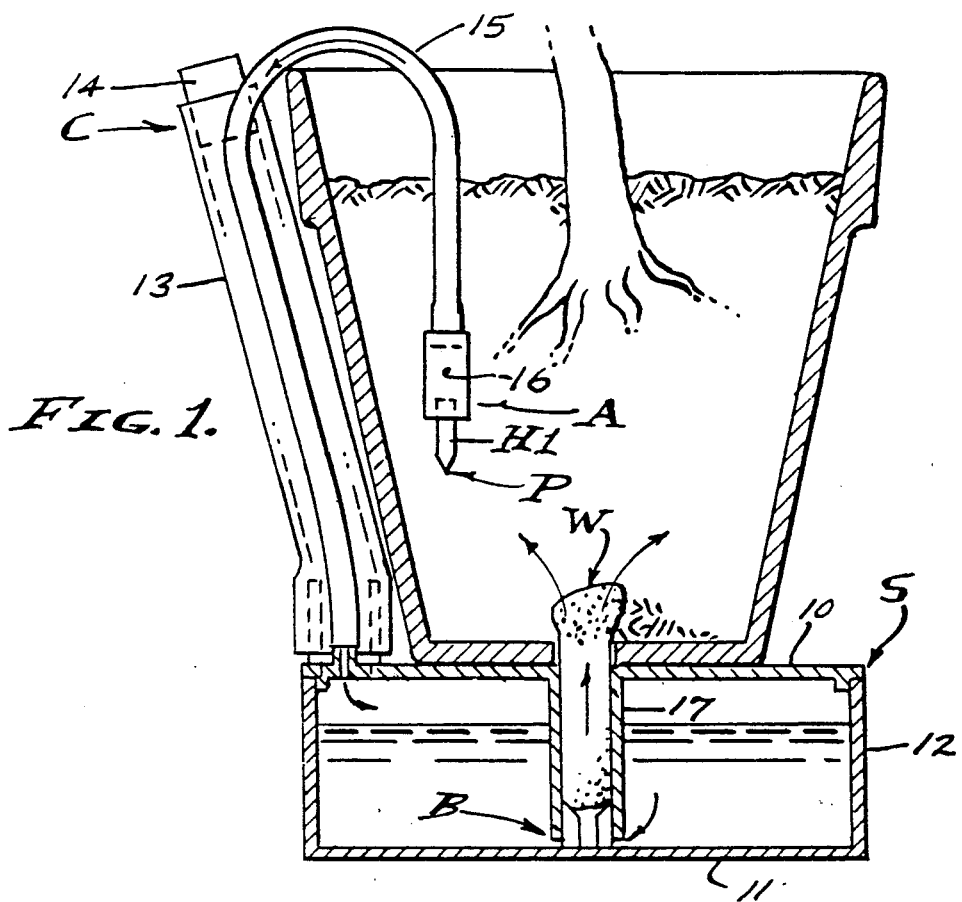
FIG. 1 is a sectional elevation view of the Wick Waterer of the present invention, used as a platform to support a planter pot and provide water to the soil held therein.
Figure 2:
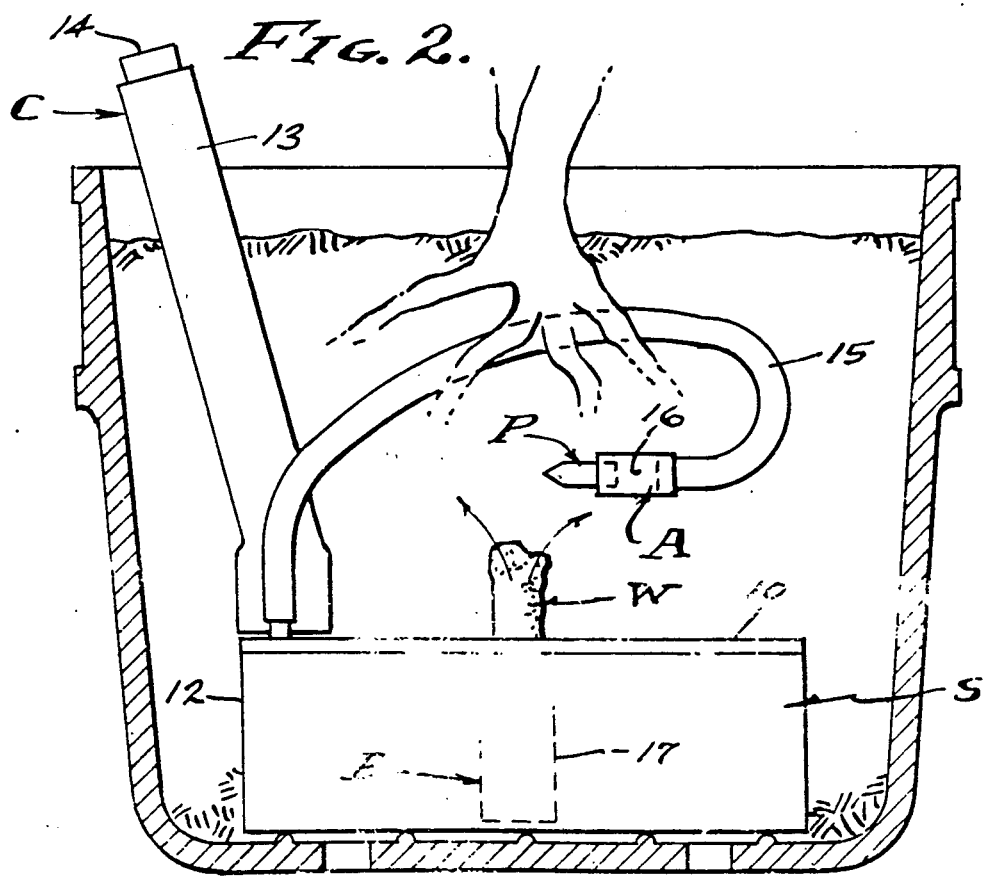
FIG. 2 is an elevational view similar to FIG. 1, showing use of the Wick Waterer buried within a decorative planter pot.

Referring now to the drawings, this Automatic Wick Waterer For Plants is shown in its preferred form applied to potted plants, and adapted to two modes of application. As shown in FIG. 1 the waterer is a self contained unit presenting a base upon which the planter pot is supported with a wick entering the growing medium through an opening in the bottom of the pot. As shown in FIG. 2 the same waterer unit is buried within the pot (a larger pot) with the same wick entering directly into the growing medium in which the unit is buried. The waterer unit involves, generally, a water supply chamber S, an air suction control means A, and a water control means B, and is characterized by a filler and closure means C, a moisture responsive probe P, and a wick W.

The water supply chamber S is a closed vessel that is air-tight when in use, with the exception of an air transfer tube 15 and the wick well 17 that open therein for control. As shown, the chamber S is a flat round vessel having a top 10 and a bottom 11 joined by a cylindrical upstanding side wall 12. The top 10 can be employed as a platform to support a planter pot (FIG. 1) or the entire waterer unit can be buried in a planter pot (FIG. 2).

The filler and closure means C is preferably a standpipe 13 that projects upwardly from the periphery of the chamber S so as to extend to and/or above the soil or growing medium level (FIG. 2), or to extend to the rim of the planter pot (FIG. 1). In practice the standpipe 13 is closed by a removable plug or stopper 14 after filling the supply chamber S with water thereby hermetically sealing the chamber subject to the aforementioned exceptions for control.

The air suction control means A is shown as a flexible air transfer tube 15 extending from and opening into the top 10 of the water supply chamber S said tube carrying the moisture responsive probe P at its terminal end. A feature of the probe P is its hydrophilic property as a porous element H1 to pass water and air in proportion to their availability in the soil or growing medium. In practice the hydrophilic element is a chemically treated porous plastic rod as manufactured by Porex Technologies in Fairburn, Ga. In accordance with this invention the hydrophilic element H1 is followed by a hydrophobic membrane element H2 to pass air only into the air transfer tube 15. In practice the hydrophobic membrane is a microporous, coated clothlike material as manufactured by W. L. Gore & Associates, Inc. in Elkton, Md. Intermediate the controlling elements H1 and H2 there is a closed entrapment chamber 16 into which the air and water mixture percolates, the fluid volume of air and water being controlled by the hydrophilic element H1, and the liquid volume being precluded by element H2 from entering the air transfer tube 15. As a result, air only is admitted into the air transfer tube 15 for permitting the controlled displacement of water therefrom.

The water control means B is exposed to the discharge of water from the water supply chamber S, as controlled by the means A above described. The means B employs the capillary principal, either directly into the soil or preferably via a wick W. Direct capillary flow of water into the soil (not shown) is by filling the well 17 with soil the same as next described in reference to the wick W. When soil is used as capillary material a filter is placed in the bottom of the wick well to prevent soil particles from clogging the inlet area. Accordingly, the means B exposes capillary material, either soil or a wick, to the rise and fall of water within the well 17. As shown, the wick W is composed of a fibrous capillary material or the like and elongated so as to extend from the lower interior of chamber S to a height above the top 10 and buried in the soil or medium. A feature of means B is the well 17 that opens upwardly at the top 10 to receive the soil or preferably the wick W, and extends downwardly to open into the chamber S immediately above the bottom 11.

In accordance with this invention, water enters the well 17 as and when it is discharged from the chamber S as a result of air displacement permitted by the air suction control means A hereinabove described.

Referring to FIGS. 4 and 5 of the drawings, it will be observed that the terminal bottom end 18 of wick W is spaced substantially above the open bottom end 19 of well 17, there being a wick immersion chamber 20 therebetween. It is this chamber 20 that controls the extent to which wick W, is immersed when the water discharge raises the water level in said chamber 20, and alternately recedes from the wick 20 so that it becomes inactive. Accordingly, the capillary wicking function starts and stops in response to the water discharge controlled by the moisture responsive probe P. In practice, there is a stop 21 that determines the height of the wick end 18 above the open lower end 19 of the wick well 17. The height of chamber 20 as shown in the drawings and will vary depending upon watering requirements. Use of the wick W facilitates preparation and affords greater and predictable control.

A feature of this invention and the well 17 with its wick W in the immersion chamber 20, is a means to accommodate tilting of the planter pot and/or of the entire apparatus or planting. In carrying out this invention, the wick stop 21 is in the form of a plurality of internal ribs within the tubular well 17, leaving the center area of the well open and clear. The primary function of the rib-like stops 21 is to support and restrictively locate the terminal bottom end 18 of the wick, and a secondary function thereof is to support and restrictively locate the lower open end 19 of the well space slightly above the supporting bottom 11 of the supply chamber S. The means to accommodate tilting is in the top end formation of the rib-like stops 21 which are downwardly and inwardly declined so as to form the terminal bottom end configuration of the wick W into a cone shape, as shown. Said cone shape has a theoretical apex centered at a. The cone angle is shown as x, which indicates the angular level to which the well and the entire unit can be tilted about the apex a without immersion of the wick when the water level in chamber 20 is below the apex a.

Having described only the typical preferred forms and applications of my invention, I do not wish to be limited or restricted to the specific details herein set forth, but wish to reserve to myself any modifications or variations that may appear to those skilled in the art as set forth within the limits of the following claims.

I claim:

1. An automatic soil waterer responsive to soil air for controlling dampness in the soil, and including:
   an airtight water supply chamber having an air transfer opening to admit control air and having a water discharge from its bottom for delivery of water into the soil;
   and air suction control means comprised of a hydrophilic element having a strong affinity to and passing water with soil air and followed by a hydrophobic element lacking affinity to water and passing only soil air through said transfer opening for displacement of water from the supply chamber water discharge and into the soil.

2. The soil waterer as set forth in claim 1, wherein the supply chamber is made airtight by a filler and closure means opening upwardly therefrom.

3. The soil waterer as set forth in claim 1, wherein the hydrophilic and hydrophobic elements are separated by a water entrapment chamber through which the soil air is percolated and passes.

4. The soil waterer as set forth in claim 1, wherein the hydrophilic element is a probe of porous material placed in the soil subject to dampness control.

5. The soil waterer as set forth in claim 1, wherein the air suction control means includes a tube in open communication between the hydrophilic element and the air transfer opening into the water supply chamber.

6. The soil waterer as set forth in claim 1, wherein the air suction control means includes a tube in open communication between the hydrophobic element and the air transfer opening to the water supply chamber.

7. The soil waterer as set forth in claim 1, wherein the hydrophilic and hydrophobic elements are separated by a water entrapment chamber through which the soil air is percolated and passes, and wherein a tube extends in open communication between the hydrophobic element and the air transfer opening to the water supply chamber.

8. The soil waterer as set forth in claim 1, wherein the hydrophilic element is a probe of porous material placed in the soil subject to dampness control and the hydrophobic element is a membrane separated from the porous material by a water entrapment chamber through which the soil air percolates and passes.

9. The soil waterer as set forth in claim 1, wherein the hydrophilic element is a probe of porous material placed in the soil subject to dampness control and the hydrophobic element is a membrane separated from the porous element by a water entrapment chamber through which the soil air percolates and passes, and wherein a tube extends in open communication between the hydrophobic element and the air transfer opening to the water supply chamber.

10. The soil waterer as set forth in claim 1, wherein the supply chamber is made airtight by a filler and closure means opening upwardly therefrom, wherein the hydrophilic element is a probe of porous material for penetration into the soil subject to dampness control and the hydrophobic element is a membrane separated from the porous element by a water entrapment chamber through which the soil air percolates and passes, and wherein a flexible tube extends in open communication between the hydrophobic element and the air transfer opening to the water supply chamber.

11. An automatic soil waterer responsive to soil air for controlling dampness in the soil, and including;
   an air tight water supply chamber having an air transfer opening to admit control air and having a water discharge from its bottom for delivery of water into the soil,
   an air suction control means comprised of a porous element through which soil air and water passes spaced from a hydrophilic element allowing only air to pass through said transfer opening for displacement of water from the supply chamber water discharge,
   and a water control means comprised of a well open to the water discharge at the bottom of the water supply chamber, and capillary material terminating above the water discharge at the bottom of the well and water supply chamber and exposed to rise and fall of water in the well and extending upwardly into the soil.

12. The soil waterer as set forth in claim 11, wherein said capillary material terminating above the water discharge at the bottom of the well and water supply chamber defines an immersion chamber for the rise and fall of water in the well and controller immersion of said capillary material.

13. The soil waterer as set forth in claim 11, wherein the capillary material is a wick extending upwardly into the soil.

14. An automatic soil waterer responsive to soil air for controlling dampness in the soil, and including;
   an airtight water supply chamber, having an air transfer opening to admit control air and having a water discharge from its bottom for delivery of water into the soil,
   an air suction control means comprised of a hydrophilic element having a strong affinity to and passing water with soil air and followed by a hydrophobic element lacking affinity to water and passing only soil air through said transfer opening for displacement of water from the supply chamber water discharge and into the soil,
   and water control means comprised of a well open to the water discharge at the bottom of the water supply chamber, and capillary material exposed to rise of water in the well and extending upwardly into the soil.

15. The soil waterer as set forth in claim 14, wherein the capillary material terminates above the water discharge at the bottom of the well and water supply chamber and defining an immersion chamber for the rise and fall of water in the well and controlled immersion of said capillary material.

16. The soil waterer as set forth in claim 14, wherein the capillary material is a wick extending upwardly into the soil.

17. The soil waterer as set forth in claim 14, wherein the capillary material is a wick extending upwardly into the soil and terminating above the water discharge at the bottom of the well and water supply chamber and defining an immersion chamber for the rise and fall of water in the well and controlled immersion of said wick.

18. An automatic soil waterer for potted plants and responsive to and controlling dampness in the soil, and including;
   an airtight water supply chamber in the form of a vessel having a top to serve as a platform and having an air transfer opening to admit control air and having a water discharge from its bottom for delivery of water into the soil,
   an air suction control means comprised of a hydrophilic probe element having a strong affinity to and passing water with soil air and followed by a hydrophobic element lacking affinity to water and passing only soil air through said transfer opening for displacement of water from the supply chamber water discharge and into the soil,
   and water control means comprised of a well open from the water discharge at the bottom of the water supply chamber and through the top of the vessel, and capillary material in and exposed to rise of water in the well and extending upwardly therefrom and into the soil.

19. The soil waterer as set forth in claim 18, wherein the supply chamber is made airtight by a filer and closure means opening upwardly from the top of the vessel.

20. The soil waterer as set forth in claim 18, wherein the capillary material terminates above the water discharge at the bottom of the well and water supply chamber and defining an immersion chamber for the rise and fall of water in the well and controlled immersion of said capillary material.

21. The soil waterer as set forth in claim 18, wherein the capillary material is a wick extending upwardly into the soil.

22. The soil waterer as set forth in claim 18, wherein the capillary material is a wick extending upwardly into the soil and terminating above the water discharge at the bottom of the well and water supply chamber and defining an immersion chamber for the rise and fall of water in the well and controlled immersion of said wick.

23. The soil waterer as set forth in claim 18, wherein the air suction control means includes a flexible tube in open communication between the hydrophobic element and the air transfer opening in the water supply chamber, for selective positioning of the probe in the soil.

* * * * *